United States Patent Office 3,456,326
Patented July 22, 1969

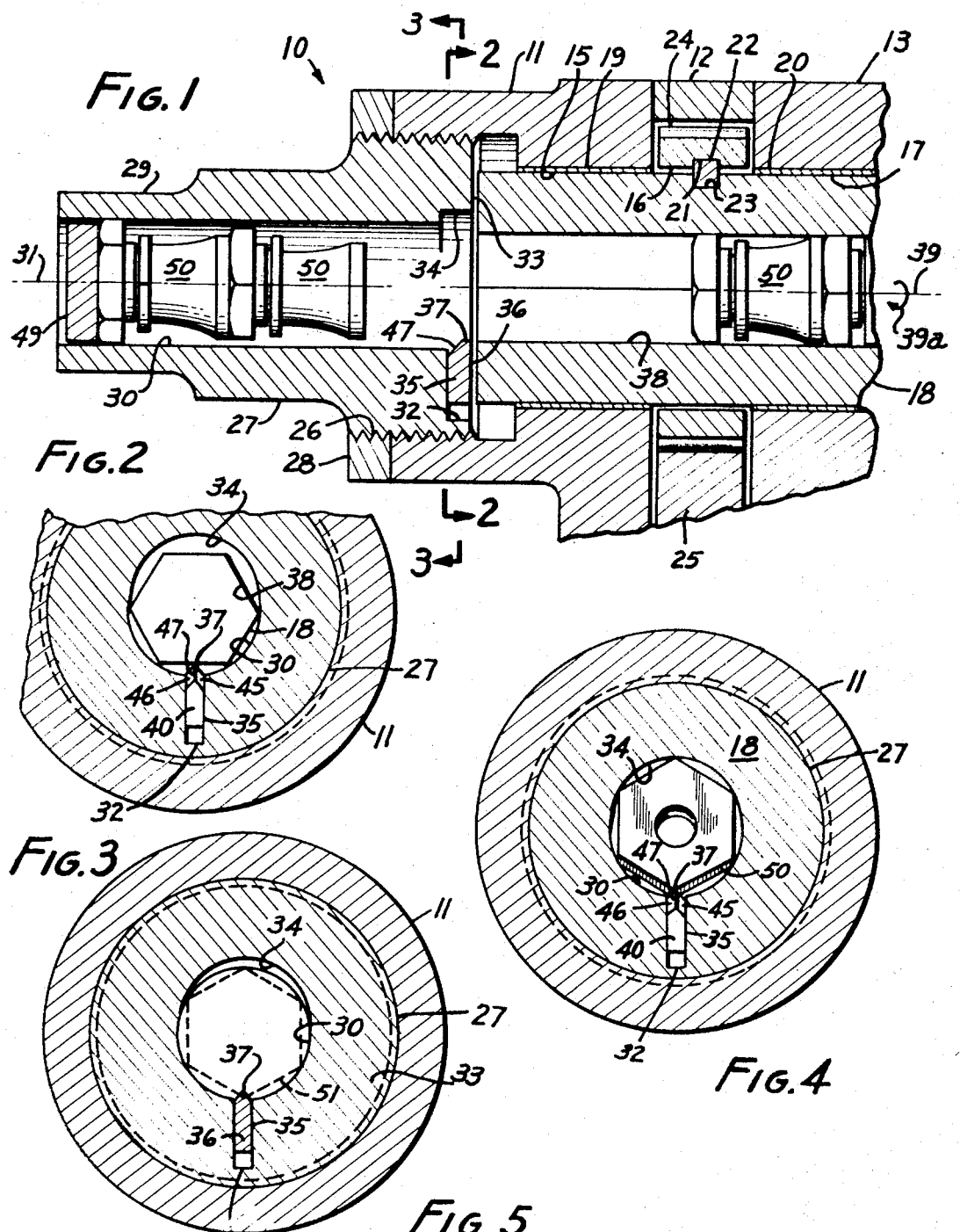

3,456,326
FASTENER DRIVING TOOL WITH FASTENER ALIGNING MEANS
Ronald W. Batten, Torrance, Calif., assignor to Hi-Shear Corporation, Torrance, Calif., a corporation of California
Filed Oct. 25, 1966, Ser. No. 590,154
Int. Cl. B23q 7/10; B23p 19/04
U.S. Cl. 29—211          12 Claims

ABSTRACT OF THE DISCLOSURE

This disclosure relates to a feed device and rotary driver for rotationally aligning and driving a previously randomly-aligned group of nut-like objects which have a noncircular contour at some location along their length, such as a hexagonal set of driving surfaces. The device includes a tube having a first axis which is adapted to enclose a train of the objects and to move them along the first axis toward a hollow driving spindle. In the tube, they are randomly aligned around the first axis. The hollow spindle has a second axis which is aligned with the first axis and includes driving surfaces adapted to contact at least a part of the noncircular contour and turn the nut-like objects for driving the same. A locating pin is mounted to the tube and extends into it. It carries positioning means adjacent to the joint between the spindle and the tube for rotationally aligning the noncircular contour of the objects in the tube. A tip on the pin is positioned downstream from the positioning means where it contacts the noncircular contour of the nut-like object for restraining its rotational movement within the tube after the object has been aligned by the positioning means.

---

This invention relates to a power operated driver for driving nuts, and particularly to a feed mechanism included therein.

An object of the present invention is to provide a locating means for an automatic feed device for rotary drivers for locating a nut-like object in the automatic feed device until the object is fully engaged by the rotary driver.

Automatic feed devices for rotary drivers generally comprise a tube for feeding nut-like objects to a rotatable driving spindle. The nut-like objects have a noncircular contour at some location along their length, and the rotatable spindle carries a passage having a cross-section which is at least partially noncircular and adapted to contact the noncircular portion of the nut-like objects, thereby rotating the nut-like objects within the spindle passage. Locating means is generally provided for locating the nut-like objects in the tube adjacent the spindle. The nut-like objects are biased towards the spindle so as to be forced therein when the noncircular cross-section of the spindle passage aligns with the noncircular contour of the object.

According to the present invention, a locating pin extends into the feed tube of a rotary driver. The pin has a surface adapted to contact the noncircular contour of the nut-like object for rotationally aligning the nut-like object within the tube and a tip for restraining rotational movement of the nut-like object within said tube.

An optional and desirable feature of the present invention is the provision of a slot within the tube diametrically opposite the pin for relocating a nut-like object as the driver rotates.

The above and other features of the invention will be fully understood from the following detailed description and the accompanying drawings, in which:

FIG. 1 is a side elevation, partially in cross-section, of a feed tube, locater and driver according to this invention;

FIGS. 2 and 3 are cross-sections taken at lines 2—2 and 3—3 respectively, of FIG. 1 and illustrate a locating pin according to this invention in position with a feed tube and driver;

FIG. 4 is a cross-section similar to FIG. 2 illustrating a driver rotated from the position in FIG. 2 and a nut-like object just entering the driver; and FIGS. 5 and 6 are perspective views of a locating pin according to the present invention.

In the drawings there is shown a driver 10 which includes a front cover 13, a bearing plate 12 and a rear cover 11. This stack of two covers and bearing plate forms a body which is held together by means not shown. The front cover, bearing plate and rear cover each has an axially aligned passage 15, 16, 17, respectively. A drive spindle 18 fits in these passages supported by bearings 19 and 20 within passages 15 and 17, respectively.

The spindle has an external key slot 21 for receiving a key 22. The slot and key are placed axially between bearings 19 and 20 so that the key fits in slot 21 in the spindle and also in the slot 23 in spur gear 24, thereby coupling the spur gear to the spindle. Spur gear 24 meshes with a second spur gear 25 which is driven by a suitable drive motor (not shown) to provide rotational movement of spindle 18 about axis 39 as indicated by arrow 39a.

Rear cover 11 is provided with a threaded receptacle 26 to which an end plug 27 is threaded. A lock-nut 28 is threaded onto the end plug and bears against the rear cover. The end plug terminates at a neck 29 to which a feed tube (not shown) is attached by pushing the tube over the outside of neck 29. Thus, end plug 27 forms the forward terminal end of the feed tube and is connected to the driver housing.

A central bore 30 formed about axis 31 extends through end plug 27. Within the end plug there is a first slot 32 formed in bore 30 and in face 33 at the right hand end of end plug 27, as shown in FIG. 1. A second slot 34 is recessed into bore 30 diametrically opposite slot 32. As best illustrated in FIGS. 1 and 3, slot 32 has a substantially rectangular cross-section as viewed both in parallel and perpendicular to axis 31; while slot 34 has a substantially arcuate cross-section as viewed from face 33 of the end plug. Slot 34 may be conveniently formed by counterboring off center from axis 31 of central bore 30 with a suitable drill or other counterboring means having a diameter less than the diameter of bore 30. As illustrated in FIG. 1, the depth into bore 30 from face 33 of slot 34 is greater than the depth of slot 32.

Set within slot 32 is a locating pin 35. Pin 35 is fixed within slot 32 so that face 36 is flush with face 33 of the end plug. Pin 35 is arranged within slot 32 so that a tip 37 extends a short distance into bore 30 of the end plug.

Drive spindle 18 has a spindle passage 38 which is prismatic and is formed about axis 39 through the spindle. The surfaces of passage 38 are adapted to contact the non-circular portion of nuts 50. Axes 31 and 39 of the end plug and spindle passage, respectively, are coincident at the junction between the end plug and spindle passage. As best illustrated in FIGS. 1 and 2, tip 37 of pin 35 extends into bore 30 of the end plug for a short distance so that tip 37 is approximately aligned with one surface of the prismatic passage of spindle 38 when that surface lies in a plane normal to the diametrical alignment of pin 35.

Pin 35, which is illustrated in greater detail in FIGS. 5 and 6, may be formed out of a rectangular block, for example ⅛" x ⅛" heat-treated high-speed steel blank.

Opposite face 36 of pin 35 is a face 40 which abuts the end of slot 32 most remote from face 33 of the end plug. Side faces 41 and 42 are perpendicular to faces 36 and 40. Faces 43 and 44 are each perpendicular to faces 36 and 40 and at an angle preferably approximating 45° from faces 41 and 42 respectively. The junction between faces 43 and 44 is preferably rounded off with a small radius, for example, 0.020 inch, and forms tip 37 on pin 35. Faces 45 and 46 (sometimes called "positioning means") are formed as shown, preferably at approximately 35° to each of faces 43 and 44, respectively. Dihedral edge 47 is formed by faces 45 and 46. From a side view, as illustrated in FIG. 1, the resulting angle between tip 37 and edge 47 is approximately 45°. The locating pin is positioned in slot 32 so that the positioning surfaces 45 and 46 are upstream from tip 37.

The operation of the device will now be described in connection with the attachment of a nut, such as nut 50. A feed tube (not shown) is fitted over neck 29 of end plug 27. In practice, the tube is connected to a source of compressed fluid, such as a compressed air line (not shown). Fluid under pressure is applied to piston 49 to provide a bias force on a train of nuts. The piston is biased by this pressure to force a train of randomly aligned nuts 50 toward and through the spindle.

In order to simplify the drawings, only three nuts are shown in FIG. 1. In fact, there is a continuous train of abutting nuts. The left-hand nut is shown abutted by the piston, and the right-hand nut is engaged within the sleeve. The space between these two end nuts is filled with similar nuts in a continuous train, each nut pushing along the one in front of it with a force derived from the bias force.

A drive motor (not shown) drives the gear train formed by spur gears 24 and 25, thereby causing rotation of drive spindle 18 as indicated by arrow 39a. The air pressure presses the train of nuts 50 along bore 30 so that the nuts move toward spindle passage 38. It will be noted that end plug 27 is not rotating, while the adjacent end of the spindle is. Without pin 35, it is possible that a nut might bear against the spindle, out of registration therewith, and spin along with the spindle so that it would never enter the same. The locating pin of this invention avoids that situation.

As the train of nuts travels through bore 30, the forward end of each nut enters passage 38 of spindle 18. At this position, the nuts within bore 30 are randomly aligned about their own axes. Assuming a nut 50 is aligned to an optimum position so that its hexagonal portion is aligned to the cross-section of spindle passage 38, as illustrated in FIG. 2, the aligned nut 50 will enter passage 38 due to the bias force applied to the train.

Assuming, however, that the nut is not in the position shown in FIG. 2 with relation to spindle passage 38, but rather is aligned in some other position, for example, in the position illustrated by dotted lines 51 in FIG. 3, one face of the hexagonal portion of nut 50 will contact either oblique face 45 or 46 of the positioning means of pin 35. When the hexagonal portion of the nut contacts the positioning means, the nut will rotate around the nut axis in a direction depending upon which face 45, 46 of the positioning means the hexagonal portion of the nut contacts. The force on the train of nuts 50 is sufficient to cause the hexagonal portion of the nut which contacts face 45 or 46 to rotate off the contacted face 45 or 46 around the nut axis, as the nut moves axially until the hexagonal portion of the nut slips over tip 37 of the pin. The nut will now be held in position, as illustrated in FIG. 2, by tip 37 of pin 35 until sleeve 18 rotates to a position such that passage 38 is aligned with the prismatic shape of the nut. At this time, the pressure on the train of nuts forces the nut into spindle passage 38.

Although the nut enters spindle passage 38 fairly rapidly, it may occur that spindle 18 might rotate a small amount from the position illustrated in FIG. 4 while a nut is entering the spindle passage. Assuming that a nut is partially engaged within the spindle passage 38 and partially within the position held by pin 35, and that spindle 18 rotates to another position other than that shown in FIG. 2, the nut will merely tilt off pin 35 into slot 34. This is illustrated in FIG. 4.

In FIG. 4, the hexagonal portion of nut 50 is illustrated as partially within spindle passage 38. Spindle 18 has rotated spindle passage 38, and the rear portion of nut 50 is forced upwardly by pin 35 into slot 34. Thus, the axis of nut 50 becomes slightly inclined in relation to axis 39 of passage 38, causing the forward portion of the nut to be inclined downwardly. Since the arcuate diameter of slot 34 is less than the diameter of bore 30, nut 50 is cammed off the wall of slot 34 as rotation of spindle 18 continues. The camming of the nut off the wall of slot 34 causes nut 50 to realign with axes 31 and 39 when spindle 18 returns to the position shown in FIG. 2. Thus, arcuate slot 34 is of such diameter as to permit the camming action upon rotation of spindle 18, and is off-center from axis 31 to allow the hexagonal portion of nut 50 to enter therein.

This tool is useful for setting many types of fasteners in addition to the fasteners of the type illustrated. The orienting device is useful for nearly any type of fastener.

The locating pin is efficient, useful and requires a minimum of service since it has no moving parts and needs no adjustments (the pin and diametrically opposite slot being at fixed positions on the tube or end plug).

This invention is not to be limited by the embodiment shown in the drawings and described in the description, which is given by way of example and not of limitation, but only in accordance with the scope of the appended claims.

What is claimed is:

1. A feed device and rotary driver for rotationally aligning and driving a previously randomly-aligned group of nut-like objects which have a noncircular contour at some location along their length, comprising: a tube having a first axis, said tube being adapted to enclose a train of nut-like objects which may be randomly-aligned around said first axis; a hollow spindle joined to the tube having a second axis and an axial passage therethrough; means for rotating said spindle around said second axis relative to said tube; driving surfaces in said passage adapted to contact at least a part of the noncircular contour of the nut-like objects and rotate said nut-like objects with the spindle; said first and second axes being coincident where the spindle and tube join; a locating pin mounted to said tube and extending into said tube; positioning means on said pin for rotationally aligning the noncircular contour of a nut-like object in said tube adjacent the joint between said spindle and tube; and a tip on said pin downstream from said positioning means adapted to contact the noncircular contour of the nut-like object for restraining rotational movement of the nut-like object within said tube adjacent the joint between said spindle and tube.

2. Apparatus according to claim 1 wherein said positioning means is a first surface on said pin oblique to said first axis.

3. Apparatus according to claim 2 wherein said tip is approximately aligned with the surface of said spindle passage nearest the pin when said surface is normal to the diametrical alignment of said pin.

4. Apparatus according to claim 3 further including a slot recessed into said tube diametrically opposite said pin.

5. Apparatus according to claim 4 wherein said slot is arcuate.

6. Apparatus according to claim 1 further including a slot recessed into said tube diametrically opposite said pin.

7. Apparatus according to claim 6 wherein said slot is arcuate.

8. In a feed device and rotary driver for rotationally aligning and driving a previously randomly-aligned group of nut-like objects which have a noncircular contour at some location along their length, said feed device having a tube having a first axis adapted to enclose a train of randomly-aligned nut-like objects, a hollow spindle having a second axis joined to the tube and having an axial passage therethrough, means for rotating said spindle relative to said tube, and driving surfaces in said passage adapted to contact at least in part of the noncircular contour of the nut-like objects and rotate said nut-like objects with the spindle, said first and second axes being coincident where the spindle and tube join, the improvement comprising: a locating pin mounted to said tube and extending into said tube, positioning means on said pin for rotationally aligning the noncircular contour of a nut-like object in said tube adjacent the joint between said spindle and tube, and a tip on said pin downstream from said positioning means adapted to contact the noncircular contour of the nut-like object for restraining rotational movement of the nut-like object within said tube adjacent the joint between said spindle and tube.

9. Apparatus according to claim 8 wherein said positioning means is a first surface on said pin oblique to said first axis.

10. Apparatus according to claim 9 wherein said tip is approximately aligned with the surface of said spindle passage nearest the pin when said surface is normal to the diametrical alignment of said pin.

11. Apparatus according to claim 10 further including a slot recessed into said tube diametrically opposite said pin.

12. Apparatus according to claim 11 wherein said slot is arcuate.

References Cited
UNITED STATES PATENTS

| | | | |
|---|---|---|---|
| 2,974,406 | 3/1961 | Vilmerding | 29—240 X |
| 3,155,993 | 11/1964 | Stern | 10—155 |
| 3,345,729 | 10/1967 | Law | 29—211 |

THOMAS H. EAGER, Primary Examiner

U.S. Cl. X.R.

29—240